United States Patent [19]
Conlee

[11] 3,799,184
[45] Mar. 26, 1974

[54] FLUID FLOW DETECTOR AND CONTROL FOR A HOT WATER SYSTEM

[75] Inventor: George D. Conlee, Humboldt, Iowa

[73] Assignee: Slifer Manufacturing Company, Incorporated, Humboldt, Iowa

[22] Filed: May 16, 1972

[21] Appl. No.: 253,831

[52] U.S. Cl............... 137/94, 137/101.21, 122/448
[51] Int. Cl. ...... F22b 37/42, F23n 1/00, F23n 1/08
[58] Field of Search................ 137/94, 101.21, 499; 73/228; 122/448

[56] References Cited
UNITED STATES PATENTS
2,038,289  4/1936  Herbster............................ 137/94 X
2,359,338  10/1944  Tyden............................... 137/499 X FOREIGN PATENTS OR APPLICATIONS
1,103,119  2/1968  Great Britain....................... 73/228
759,639  11/1933  France............................... 137/94
976,535  10/1963  Germany............................. 73/228

Primary Examiner—William R. Cline
Attorney, Agent, or Firm—Zarley, McKee & Thomte

[57] ABSTRACT

A hot water system includes a heater element and an outlet valve. A flow detector and control is provided in the inlet line to the water heater such that when water flow is stopped the detector deactivates the heater. The detector includes a rectangular shaped vane pivoted in a rectangular in cross section chamber having an inlet and outlet port on opposite sides thereof. The chamber is enlarged at the outlet port by including lune-shaped openings on opposite sides of the vane to provide a bypass when the vane is moved to adjacent the outlet port. The rectangular vane corresponds substantially to the dimensions of the rectangular in cross section chamber when the vane is adjacent the inlet port thereby preventing fluid flow around the vane. The vane includes semicylindrical shoulders on opposite sides of the pivotal axis so positioned at the chamber side walls to prevent flow therebetween. The vane is normally pivoted to a position adjacent the inlet port and in response to fluid flow pivots to a position adjacent the outlet port thereby actuating a control for operating the heater.

10 Claims, 5 Drawing Figures

PATENTED MAR 26 1974 3,799,184

FLUID FLOW DETECTOR AND CONTROL FOR A HOT WATER SYSTEM

A high pressure cleaning system utilizing water and a cleaning solution involves a heater for the water. When the spray gun is shut off no water flows and thus the water being heated can become overheated unless the heater is also deactivated.

The fluid flow detector and control for a hot water system of this invention detects the flow of water into the heater and responds to the stoppage by activating an electrical switch connected to the heater thereby deactivating the heater. Conversely, when the spray gun is again used water flows from the heater and thus into the heater from the flow detector which detects this activity and actuates a switch controlling the heater element.

The detector unit is of a simple construction but highly effective in that it includes a body having a chamber rectangular in cross section in which a rectangular shaped vane is pivotally placed such that the free end of the vane extends between the inlet and the outlet ports of the detector body. A pair of enlarged lune-shaped openings are provided in the chamber at the outlet port such that when the vane pivots to the outlet port fluid may bypass the vane, however, when the vane is at the inlet port no water may pass thereby without moving the vane which is normally biased to a position adjacent the inlet port. Fluid cannot flow past the pivotal end of the vane due to semicylindrical shoulders being placed between the pivotal axis on opposite sides thereof and the adjacent chamber side walls such that there is a tangential line seal therebetween. In other words, with the exception of the enlarged openings at the outlet port the vane corresponds in shape to the cross sectional shape of the chamber. Further, an actuating arm is provided on the outside of the detector body for engaging an electrical control switch operatively connected to the burner on the heating system.

This invention consists in the construction, arrangements and combination of the various parts of the device, whereby the objects contemplated are attained as hereinafter more fully set forth, specifically pointed out in the claims, and illustrated in the accompanying drawings in which:

Figure 1:
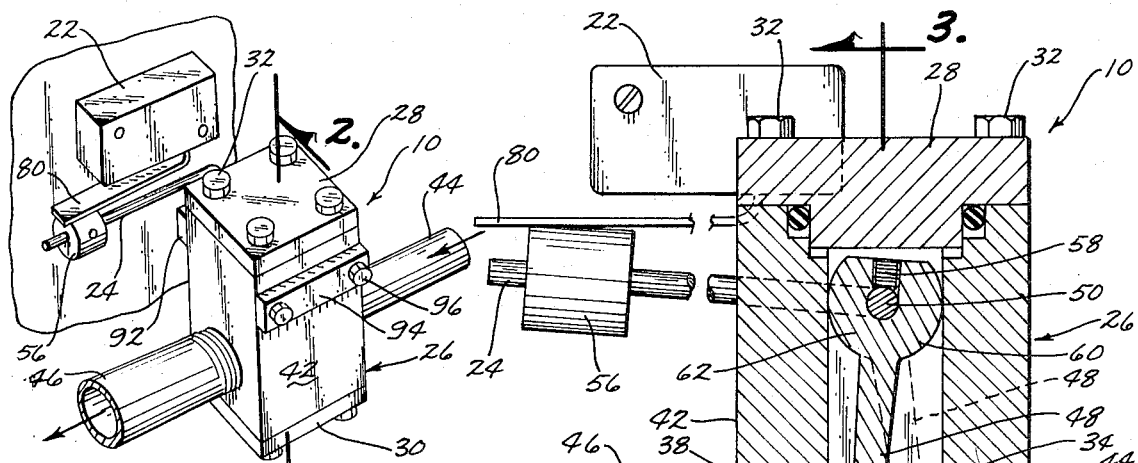
FIG. 1 is a fragmentary perspective view of the fluid flow detector and control for a hot water system and also includes an electrical switch operated thereby.
Figure 5:
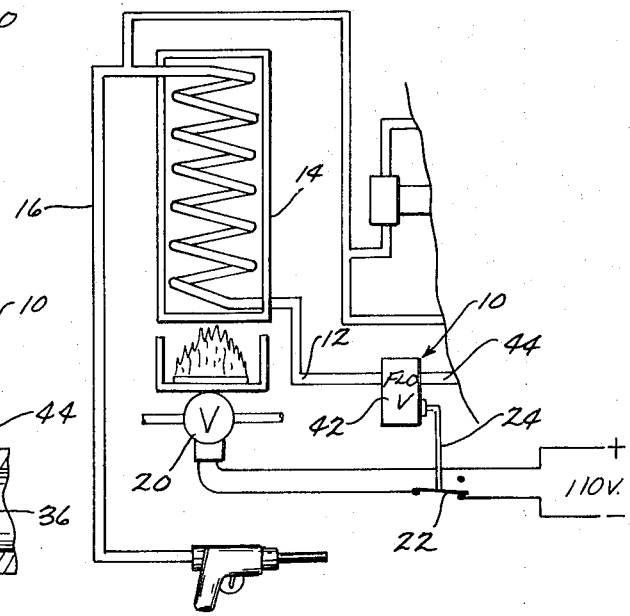
FIG. 5 is a fragmentary schematic showing the fluid flow detector in a hot water system.

The fluid flow detector and control for a hot water system is referred to in FIG. 1 generally by the reference numeral 10 and is seen in FIG. 5 positioned in an inlet line 12 connected to a heater 14 having an outlet line 16 connected to a spray gun 18. An electrically controlled heater solenoid valve 20 is provided in a circuit with a switch 22 actuated by an actuating arm 24 on the detector 10.

The detector 10 includes a body 26 having top and bottom removable end walls 28 and 30 held in place by a plurality of bolts 32.

A rectangular in cross section chamber 34 is provided in the body 26 and includes at one end oppositely disposed inlet and outlet ports 36 and 38 respectively in body side walls 40 and 42. An inlet conduit 44 is connected to inlet port 36 while a conduit 46 is connected to the outlet port 38.

A rectangular in shape vane 48 is provided in the chamber 34 and substantially corresponds to the cross sectional shape thereof. A shaft 50 extends through the vane 48 at one end for pivotal movement thereof and extends through bearings 52 positioned in the body side walls 40 and 42. The actuating arm 24 is connected to the outer end of the shaft 50 and includes a weight 56 for normally biasing the vane 48 towards the inlet port 36. A setscrew 58 is provided for locking the vane to the shaft 50.

Figure 2:
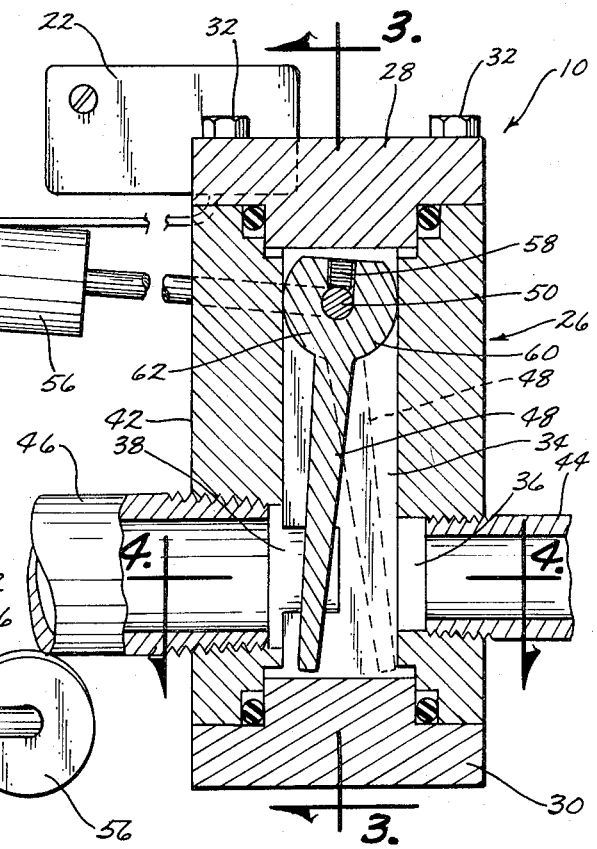
FIG. 2 is a cross sectional view taken along line 2—2 in FIG. 1.
Figure 3:
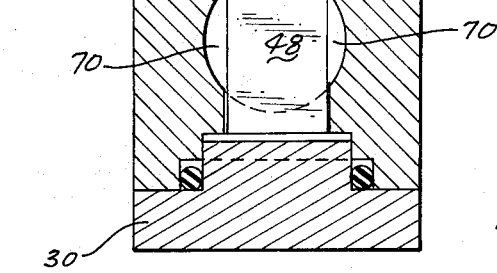
FIG. 3 is a cross sectional view taken along line 3—3 in FIG. 2.
Figure 4:
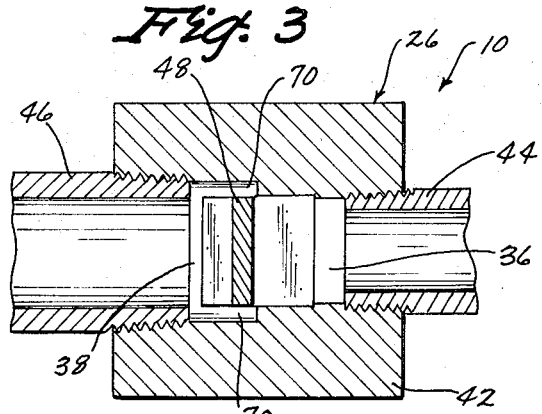
FIG. 4 is a cross sectional view taken along line 4—4 in FIG. 2.

It is seen in FIG. 2 that semicylindrical shoulders 60 and 62 are provided on the vane between the axial shaft 50 and the adjacent side walls 40 and 42 of the body 26 to prevent fluid from flowing therebetween as the vane pivots between its first position adjacent the inlet port 36 as shown by the dash lines in FIG. 3 and the solid line position adjacent the outlet port 38.

A bypass around the vane is provided at the outlet port 38 in the chamber 34 by lune-shaped openings 70 being provided on opposite sides of the vane such that when the vane has been substantially pivoted to the second position adjacent the outlet port the fluid will flow therearound but conversely, when the vane 48 is in the first position adjacent the inlet port 36 the fluid cannot flow around the vane and must then move the vane to the left overcoming the biasing action of the weight 56 tending to pivot the vane toward the inlet port. The biasing pressure on the vane 48 towards the inlet port 36 may be varied by moving the weight 56 along the actuating rod 24 as desired.

It is seen in FIG. 3 that as the vane 48 is actuated by fluid flow through the detector 10 the leaf element 80 on the switch 22 is raised or moved to a closed position as seen in FIG. 5 making a circuit through the solenoid valve 20 in the heater 14 and, similarly, when flow in the detector 10 ceases the weight 56 will cause a vane to move to the right toward the inlet port 36 opening the switch 22 by the arm 24 moving away from the leaf spring 80 thereby deactivating the heater solenoid valve 20.

The bearings 52 on the shaft 50 are held in the detector body side walls 40 and 42 by retaining plates 92 and 94 secured to the side walls by bolts 96.

I claim:

1. A fluid flow detector comprising,
a body having inlet and outlet ports on opposite sides of and in communication with a chamber,
a vane pivotally positioned in said chamber with its free end extending between said inlet and outlet ports and being adapted to pivot between first and second positions extending across said inlet and outlet ports respectively,
means for yieldably moving said vane to said first position,
an actuation means connected to and moveable with said vane outside said body,
said chamber being substantially rectangular in cross section, and said vane being substantially rectangular in shape to substantially correspond to the cross section of said chamber to close communication between said inlet and outlet ports when said vane is in said first position at said inlet port, said chamber at said outlet port only being enlarged to provide a bypass around said vane when said vane is in said second position whereby upon fluid entering said chamber through said inlet port said vane is pivoted towards said outlet port against the resistance of said yieldable means and said fluid bypasses said vane while maintaining said vane in said second position.

2. The structure of claim 1 wherein said chamber at said outlet port is enlarged by lune openings being provided on opposite sides of said vane.

3. The structure of claim 2 wherein said lune openings in said chamber at said outlet port merge into said outlet port which is circular in cross section and extends through a side wall of said body to the exterior thereof.

4. The structure of claim 3 wherein the outer edges of said lune openings are spaced apart a maximum distance equal to the diameter of said outlet port.

5. The structure of claim 1 wherein said vane and actuation means includes a pivot shaft extending to the exterior of said body and an arm provided on said shaft.

6. The structure of claim 1 wherein said rectangular in cross section chamber includes four side walls and two end walls, and said vane includes an enlarged semi-cylindrical shoulder between the pivotal axis of said vane and an adjacent chamber side wall, the outer surface of said shoulder being so positioned relative to said adjacent side wall that substantially no fluid may pass therebetween when said vane is in said first position.

7. The structure of claim 1 wherein said rectangular in cross section chamber includes four side walls and two end walls, and said vane includes an enlarged semi-cylindrical shoulder on each side between the pivotable axis of said vane and said adjacent chamber side walls, the outer surface of said shoulders being so positioned relative to said adjacent side walls that substantially no fluid may pass therebetween.

8. The structure of claim 3 wherein said chamber includes removeable closure members at opposite ends.

9. A hot water system comprising, an electrically controlled heater unit having inlet and outlet lines, a valve in said outline line, a flow detector control in said inlet line comprising, a body having inlet and outlet ports on opposite sides of and in communication with a chamber, a vane pivotally positioned in said chamber with its free end extending between said inlet and outlet ports and being adapted to pivot between first and second positions extending across said inlet and outlet ports respectively, means for yieldably moving said vane to said first position, an actuation means connected to and moveable with said vane outside said body and operatively connected to said electrically controlled heater unit, said chamber being substantially rectangular in cross section, and said vane being substantially rectangular in shape to substantially correspond to the cross section of said chamber to close communication between said inlet and outlet ports when said vane is in said first position at said inlet port; and said chamber at said outlet port only being enlarged to provide a bypass around said vane when said vane is in said second position whereby upon fluid entering said chamber through said inlet port said vane is pivoted towards said outlet port against the resistance of said yieldable means and said fluid bypasses said vane while maintaining said vane in said second position.

10. The structure of claim 9 wherein said chamber at said outlet port is enlarged by lune openings being provided on opposite sides of said vane.

* * * * *